US012730582B2

(12) United States Patent
Sistla et al.

(10) Patent No.: US 12,730,582 B2
(45) Date of Patent: Sep. 8, 2026

(54) PRE-PROGRAM PASS TO REDUCE SYSTEM BUFFER REQUIREMENT WHEN PROGRAMMING QUAD-LEVEL CELL (QLC) MEMORY

(71) Applicant: Micron Technology, Inc., Boise, ID (US)

(72) Inventors: Ratna Priyanka Sistla, Meridian, ID (US); Dan Xu, Sunnyvale, CA (US); Tomoko Ogura Iwasaki, San Jose, CA (US); Caixia Yang, Boise, ID (US); Lee-eun Yu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 136 days.

(21) Appl. No.: 18/636,584

(22) Filed: Apr. 16, 2024

(65) Prior Publication Data

US 2024/0393977 A1 Nov. 28, 2024

Related U.S. Application Data

(60) Provisional application No. 63/468,359, filed on May 23, 2023.

(51) Int. Cl.
*G11C 16/34* (2006.01)
*G06F 3/06* (2006.01)

(52) U.S. Cl.
CPC .......... *G06F 3/0655* (2013.01); *G06F 3/0604* (2013.01); *G06F 3/0644* (2013.01); *G06F 3/0679* (2013.01)

(58) Field of Classification Search
None
See application file for complete search history.

(56) References Cited

U.S. PATENT DOCUMENTS

2020/0286562 A1* 9/2020 Gorobets ............... G11C 16/10

* cited by examiner

*Primary Examiner* — Alfredo Bermudez Lozada
(74) *Attorney, Agent, or Firm* — Lowenstein Sandler LLP

(57) ABSTRACT

A memory device includes a memory array configured as quad-level cell (QLC) memory and a control logic operatively coupled to the memory array. The control logic identifies a first two bits of particular pages of a QLC logical state. The control logic causes memory cells of the memory array to be coarse programmed with a threshold voltage distribution of a multi-level cell (MLC) logical state corresponding to the first two bits. The control logic reads the MLC logical state from the memory cells and a second two bits from a cache buffer to determine the QLC logical state. The control logic causes the memory cells to be further coarse programmed with a QLC threshold voltage distribution corresponding to the QLC logical state.

18 Claims, 17 Drawing Sheets

| | TP | XP | UP | LP |
|---|---|---|---|---|
| L0 | 1 | 1 | 1 | 1 |
| L1 | 1 | 1 | 1 | 0 |
| L2 | 1 | 0 | 1 | 0 |
| L3 | 1 | 0 | 0 | 0 |
| L4 | 1 | 0 | 0 | 1 |
| L5 | 0 | 0 | 0 | 1 |
| L6 | 0 | 0 | 0 | 0 |
| L7 | 0 | 0 | 1 | 0 |
| L8 | 0 | 1 | 1 | 0 |
| L9 | 0 | 1 | 0 | 0 |
| L10 | 1 | 1 | 0 | 0 |
| L11 | 1 | 1 | 0 | 1 |
| L12 | 0 | 1 | 0 | 1 |
| L13 | 0 | 1 | 1 | 1 |
| L14 | 0 | 0 | 1 | 1 |
| L15 | 1 | 0 | 1 | 1 |

| | TP | XP | UP | LP |
|---|---|---|---|---|
| L0 | 1 | 1 | 1 | 1 |
| L1 | 1 | 1 | 1 | 0 |
| L2 | 1 | 0 | 1 | 0 |
| L3 | 1 | 0 | 0 | 0 |
| L4 | 1 | 0 | 0 | 1 |
| L5 | 0 | 0 | 0 | 1 |
| L6 | 0 | 0 | 0 | 0 |
| L7 | 0 | 0 | 1 | 0 |
| L8 | 0 | 1 | 1 | 0 |
| L9 | 0 | 1 | 0 | 0 |
| L10 | 1 | 1 | 0 | 0 |
| L11 | 1 | 1 | 0 | 1 |
| L12 | 0 | 1 | 0 | 1 |
| L13 | 0 | 1 | 1 | 1 |
| L14 | 0 | 0 | 1 | 1 |
| L15 | 1 | 0 | 1 | 1 |

| | TP | XP | UP | LP |
|---|---|---|---|---|
| L0 | 1 | 1 | 1 | 1 |
| L1 | 1 | 1 | 1 | 0 |
| L2 | 1 | 0 | 1 | 0 |
| L3 | 1 | 0 | 0 | 0 |
| L4 | 1 | 0 | 0 | 1 |
| L5 | 0 | 0 | 0 | 1 |
| L6 | 0 | 0 | 0 | 0 |
| L7 | 0 | 0 | 1 | 0 |
| L8 | 0 | 1 | 1 | 0 |
| L9 | 0 | 1 | 0 | 0 |
| L10 | 1 | 1 | 0 | 0 |
| L11 | 1 | 1 | 0 | 1 |
| L12 | 0 | 1 | 0 | 1 |
| L13 | 0 | 1 | 1 | 1 |
| L14 | 0 | 0 | 1 | 1 |
| L15 | 1 | 0 | 1 | 1 |

| | TP | XP | UP | LP |
|---|---|---|---|---|
| L0 | 1 | 1 | 1 | 1 |
| L1 | 1 | 1 | 1 | 0 |
| L2 | 1 | 0 | 1 | 0 |
| L3 | 1 | 0 | 0 | 0 |
| L4 | 1 | 0 | 0 | 1 |
| L5 | 0 | 0 | 0 | 1 |
| L6 | 0 | 0 | 0 | 0 |
| L7 | 0 | 0 | 1 | 0 |
| L8 | 0 | 1 | 1 | 0 |
| L9 | 0 | 1 | 0 | 0 |
| L10 | 1 | 1 | 0 | 0 |
| L11 | 1 | 1 | 0 | 1 |
| L12 | 0 | 1 | 0 | 1 |
| L13 | 0 | 1 | 1 | 1 |
| L14 | 0 | 0 | 1 | 1 |
| L15 | 1 | 0 | 1 | 1 |

| Dirty | TP | UP | XP | LP |
|---|---|---|---|---|
| L0 | 1 | 1 | 1 | 1 |
| L1 | 1 | 1 | 1 | 0 |
| L2 | 1 | 1 | 0 | 0 |
| L3 | 1 | 0 | 0 | 0 |
| L4 | 1 | 0 | 0 | 1 |
| L5 | 0 | 0 | 0 | 1 |
| L6 | 0 | 0 | 0 | 0 |
| L7 | 0 | 1 | 0 | 0 |
| L8 | 0 | 1 | 1 | 0 |
| L9 | 0 | 0 | 1 | 0 |
| L10 | 1 | 0 | 1 | 0 |
| L11 | 1 | 0 | 1 | 1 |
| L12 | 0 | 0 | 1 | 1 |
| L13 | 0 | 1 | 1 | 1 |
| L14 | 0 | 1 | 0 | 1 |
| L15 | 1 | 1 | 0 | 1 |

FIG. 8C
Vt
L1
L2
L3
L4
L5
L6
L7
L8
L9
L10
L11
L12
L13
L14
L15
Shift High BER States

PRE-PROGRAM PASS TO REDUCE SYSTEM BUFFER REQUIREMENT WHEN PROGRAMMING QUAD-LEVEL CELL (QLC) MEMORY

CLAIM OF PRIORITY

The present application claims the benefit under 35 U.S.C. § 119 (e) of U.S. Provisional Patent Application No. 63/468,359, filed May 23, 2023, which is incorporated by reference herein.

TECHNICAL FIELD

Embodiments of the disclosure are generally related to memory sub-systems, and more specifically, relate to a pre-program pass to reduce system buffer requirement when programming quad-level cell (QLC) memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

FIGS. 6B-6E are annotated tables illustrating different MLC-based encoding that is transitionable to QLC-based encoding and thus usable for the pre-program pass according to various embodiments.

DETAILED DESCRIPTION

Figure 1A:
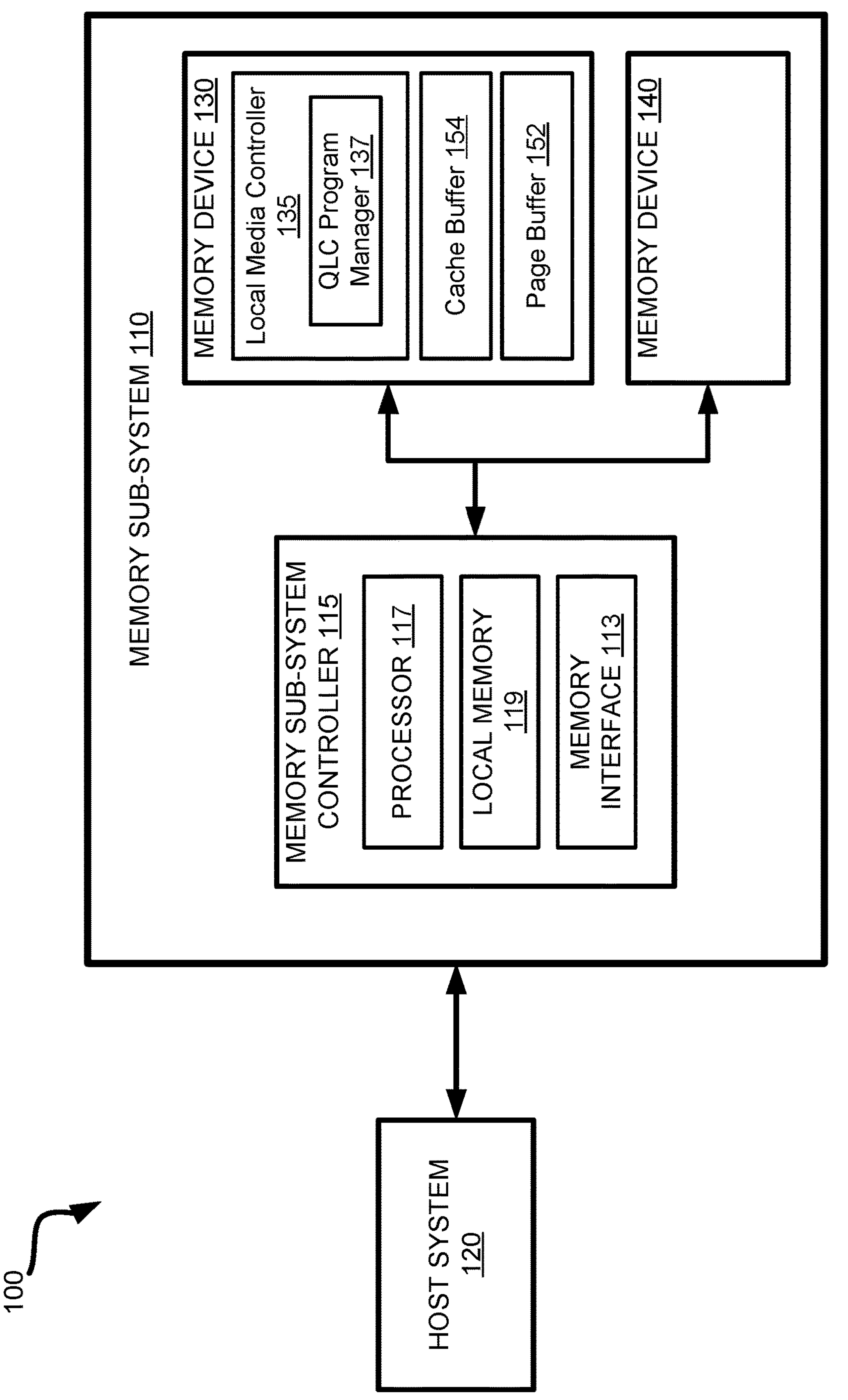
FIG. 1A illustrates an example computing system that includes a memory sub-system in accordance with some embodiments.

Embodiments of the present disclosure are directed to pre-program pass to reduce system buffer requirement when programming quad-level cell (QLC) memory. One or more memory devices can be a part of a memory sub-system, which can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a NOT- and (NAND) memory device. Other examples of non-volatile memory devices are described below in conjunction with FIGS. 1A-1B. A non-volatile memory device is a package of one or more dice. Each die can include two or more planes. For some types of non-volatile memory devices (e.g., NAND devices), each plane includes of a set of physical blocks. In some implementations, each block can include multiple sub-blocks. Each plane carries a matrix of memory cells formed on a silicon wafer and joined by conductors referred to as wordlines (WLs) and bitlines (BLs), such that a wordline joins multiple memory cells forming a row of the matrix of memory cells, while a bitline joins multiple memory cells forming a column of the matrix of memory cells.

Depending on the cell type, each memory cell can store one or more bits of binary information, and has various logic states that correlate to the number of bits being stored. The logic states can be represented by binary values, such as "0" and "1," or combinations of such values, also referred to herein as logical bit values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

Precisely controlling the amount of the electric charge stored by the memory cell allows establishing multiple logical levels, thus effectively allowing a single memory cell to store multiple bits of information. A read operation can be performed by comparing the measured threshold voltages (Vt) exhibited by the memory cell to one or more reference voltage levels in order to distinguish between two logical levels for single-level cell (SLCs) and between multiple logical levels for multi-level cells. A memory device can include multiple portions, including, e.g., one or more portions where the sub-blocks are configured as SLC memory and one or more portions where the sub-blocks are configured as multi-level cell (MLC) memory that can store three bits of information per cell and/or (triple-level cell) TLC memory that can store three bits of information per cell. The voltage levels of the memory cells in TLC memory form a set of 8 programming (or threshold voltage (Vt)) distributions representing the 8 different combinations of the three bits stored in each memory cell.

Depending on how the memory cells are configured, each physical memory page in one of the sub-blocks can include multiple page types. For example, a physical memory page formed from SLC memory cells has a single page type referred to as a lower logical page (LP). Multi-level cell (MLC) physical page types can include LPs and upper logical pages (UPs) and store two bits of information per cell. Further, TLC physical page types can include LPs, UPs, and extra logical pages (XPs) and store three bits of information per cell. Further, quad-level (QLC) physical page types can include LPs, UPs, XPs and top logical pages (TPs) and store four bits of information per cell. For example, a physical memory page formed from memory cells of the QLC memory type have a total of four logical pages, where each logical page stores data distinct from the data stored in the other logical pages associated with that physical memory page, herein referred to as a "page." Additionally, penta-level cell (PLC) memory can store five bits of information per cell and also include at least LPs, UPs, and XPs.

In certain memory devices, programming of QLC memory (e.g., memory configured as QLC) is performed in two phases. For example, the two phases can include a coarse phase where memory cells are programmed with an initial pass of one or more Vt distributions corresponding to 16 possible QLC logical states. Because the QLC Vt distributions are highly overlapped after coarse programming, these Vt distributions are difficult to read and can result in a high bit error rate (BER) if read out from the coarse-programmed Vt distributions. The second phase of programming can be a fine programming operation in which the QLC Vt distributions are more precisely programmed to a target Vt level associated with each corresponding QLC logical state.

In these memory devices, because the coarse-programmed Vt distributions would result in high BER if read, the memory device in which the QLC Vt distributions are programmed can store the QLC logical states in a cache buffer such as static random access memory (SRAM), tightly-coupled memory (TCM), or other type of cache, or a combination thereof. Here, cache buffer could also refer to non-volatile buffer memory, such as data temporarily stored in SLC or MLC mode, which could eventually be folded into QLC mode in a system background operation. In this way, the memory device still knows the QLC logical state data values, which can be used to ensure the fine programming is performed properly. Typical memory devices require significant cache buffer space in order to store the QLC data while performing the above-described two-phase QLC programming, driving up costs of expensive cache memory taking up space on chip with memory configured as QLC. This demand for cache such as SRAM or TCM can increase exponentially as sub-blocks of memory cells are added to nodes of future memory devices, creating additional cost and space challenges with use of QLC memory into the future.

Aspects of the present disclosure address the above and other deficiencies through performing an initial, or pre-program pass in which MLC logical states are first programmed to the memory cells configured as QLC. These MLC logical states can be selected and programmed in a way that stores a particular two bits of the four bits of the QLC logical states, effectively functioning as a cache within the NAND memory for half of the QLC data and correspondingly reducing the demand for expensive cache buffer resources. In at least some embodiments, the two bits corresponding to the XP and LP of the QLC logical state are selected to be those programmed as MLC logical states in this pre-program pass of the QLC memory.

In some embodiments, control logic of the memory device identifies these two bits (e.g., corresponding to the XP and LP) and causes a QLC memory array to be programmed with the threshold voltage (Vt) distribution of the MLC logical state, e.g., as a pre-program pass of the QLC memory array. Because QLC memory is configured for 16 logical states, the MLC logical state may be located and spaced in such a way that the MLC logical state is reliably read out of the QLC memory array, which will be discussed in more detail. In this way, only the other two bits (e.g., corresponding to the TP and UP of the QLC logical state) are stored in the cache buffer. In these embodiments, the control logic next reads the MLC logical state from the memory array and the second two bits (e.g., for TP and UP) from the cache buffer to determine the QLC logical state. In these embodiments, the control logic then causes the memory array to be further coarse programmed with a QLC threshold voltage distribution corresponding to the QLC logical state.

In some embodiments, because the coarse programming can still create some BER issues, the coarse programming for some of the QLC logical states can be adjusted to improve subsequent reliability in reading out the QLC logical states before fine programming of the QLC logical states. For example, the MLC logical states are no longer stored in the cache buffer and thus are not known. Thus, transitions in the MLC logical state within the QLC logical coding are expected to result in higher BER if unadjusted. In some embodiments, therefore, the control logic determines that the two MLC bits are located at a transition in MLC logical state within the QLC logical coding. In response to that determination, the control logic can shift, by a predetermined voltage (e.g., between 50-300 millivolts depending on device design), a target voltage level of the QLC logical state down to an updated target voltage level. By performing this shifting before coarse programming the 16 QLC logical states, the risk of BER of reading out the unknown logical states (involving the MLC coarse-programmed bits) is significantly reduced. While the risk of BER for the known two QLC bits (e.g., the TP and UP bits stored in the cache buffer) is increased, these two QLC bits are known and can be read out of the cache before fine programing.

Therefore, advantages of the systems and methods implemented in accordance with some embodiments of the present disclosure include, but are not limited to, reducing, by 50 percent, the amount of cache (e.g., SRAM/TCM) needed to buffer the QLC bits while performing QLC coarse and fine programming. This savings in cost and space on die of the memory device will be exponential as sub-blocks of memory cells are added to memory nodes in future memory device designs. While there is expected to be a small increase in programming time (Tprog) due to the pre-pass program operation, this small increase in Tprog is outweighed by the cost savings of half (or more) of the required cache to perform QLC programming. Other advantages will be apparent to those skilled in the art of programming memory configured to store multiple bits across different threshold voltage distributions, which will be discussed hereinafter.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such media or memory devices.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. The host system 120 can provide data to be stored at the memory sub-system 110 and can request data to be retrieved from the memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NOT- and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple-level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOT- or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage a memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein.

In at least one embodiment, the memory device 130 includes a QLC program manager 137 configured to carry out QLC programming operations, e.g., in response to receiving memory program commands from the memory interface 113. In some embodiments, the local media controller 135 includes at least a portion of the QLC program manager 137 and is configured to perform the functionality described herein. In some embodiments, the QLC program manager 137 is implemented on the memory device 130 using firmware, hardware components, or a combination of the above. In some embodiments, control logic of the QLC program manager 137 is integrated in whole or in part within the memory sub-system controller 115 and/or the host system 120. In some embodiments, the memory device 130 includes a page buffer 152, which can provide the circuitry used to program data to the memory cells of the memory device 130 and to read the data out of the memory cells.

In various embodiments, the memory device 130 includes a cache buffer 154 coupled t the local media controller 135 and the page buffer 152. In these embodiments, the cache buffer 154 includes cache memory such as SRAM, TCM, or similar fast access memory. In some embodiments, the cache buffer 154 stores QLC data (e.g., QLC logical states) while the QLC data is programmed to a memory array of the memory device 130. Through implementing the disclosed techniques and processes, the cache buffer 154 can be reduced by half due to being able to temporarily buffer only half of the QLC data during QLC programming.

Figure 1B:
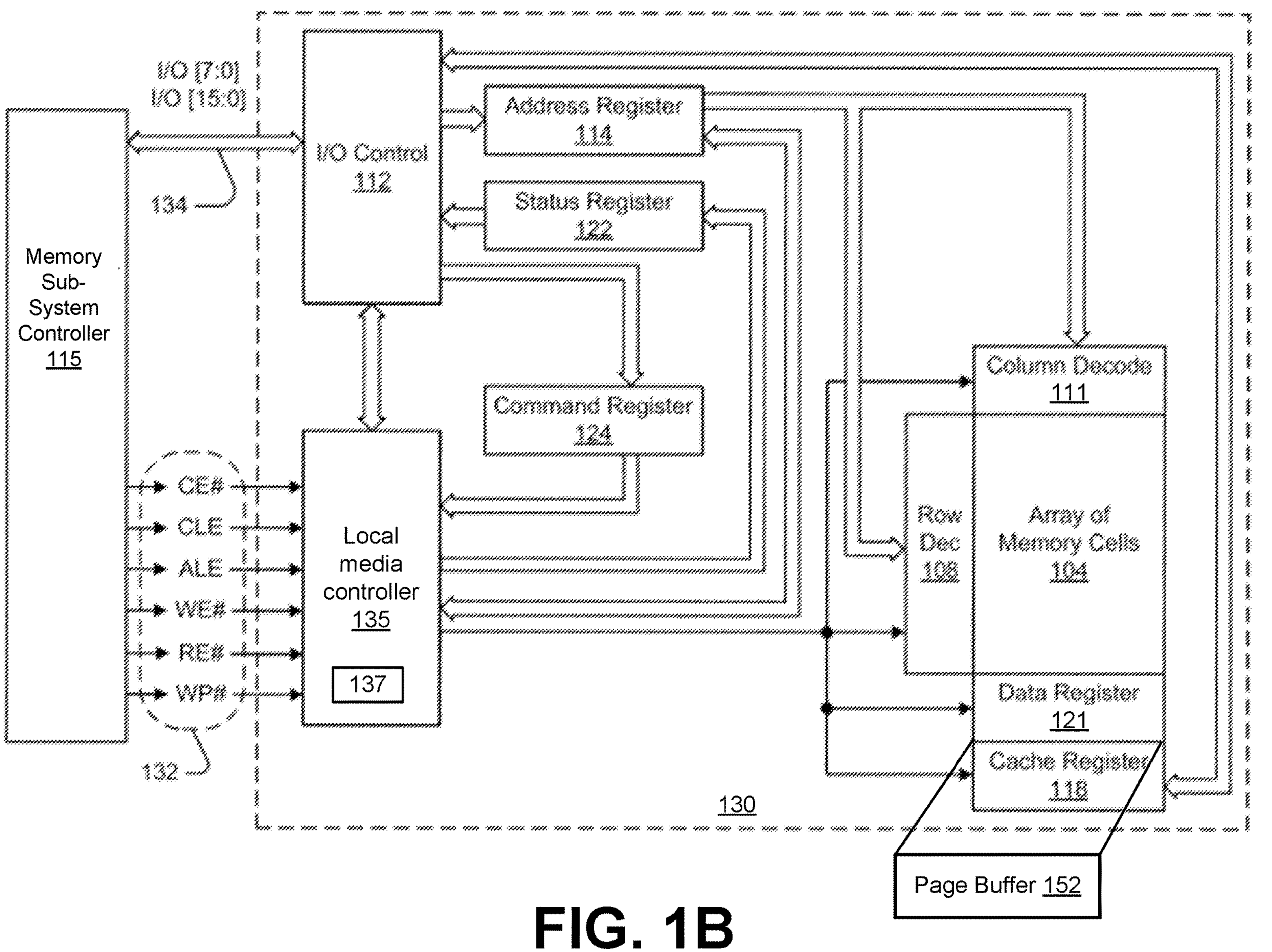
FIG. 1B is a block diagram of a memory device in communication with a memory sub-system controller of a memory sub-system according to an embodiment.

FIG. 1B is a simplified block diagram of a first apparatus, in the form of a memory device 130, in communication with a second apparatus, in the form of a memory sub-system controller 115 of a memory sub-system (e.g., the memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

The memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line can be associated with more than one logical row of memory cells and a single data line can be associated with more than one logical column. Memory cells (not shown in FIG. 1B) of at least a portion of the array of memory cells 104 are capable of being programmed to one of at least two target data states.

Row decode circuitry 108 and column decode circuitry 111 are provided to decode address signals. Address signals are received and decoded to access the array of memory cells 104. The memory device 130 also includes input/output (I/O) control circuitry 112 to manage input of commands, addresses and data to the memory device 130 as well as output of data and status information from the memory device 130. An address register 114 is in communication with the I/O control circuitry 112 and row decode circuitry 108 and column decode circuitry 111 to latch the address signals prior to decoding. A command register 124 is in communication with the I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 111 to control the row decode circuitry 108 and column decode circuitry 111 in response to the addresses.

The local media controller 135 is also in communication with a cache register 118 and a data register 121. In some embodiments, the cache register 118 makes up at least part of the cache buffer 154 (FIG. 1A). The cache register 118 latches data, either incoming or outgoing, as directed by the local media controller 135 to temporarily store data while the array of memory cells 104 is busy writing or reading, respectively, other data. During a program operation (e.g., write operation), data can be passed from the cache register 118 to the data register 121 for transfer to the array of memory cells 104; then new data can be latched in the cache register 118 from the I/O control circuitry 112. During a read operation, data can be passed from the cache register 118 to the I/O control circuitry 112 for output to the memory sub-system controller 115; then new data can be passed from the data register 121 to the cache register 118. The cache register 118 and/or the data register 121 can form (e.g., can form at least a portion of) the page buffer 152 of the memory device 130. The page buffer 152 can further include sensing devices such as a sense amplifier, to sense a data state of a memory cell of the array of memory cells 104, e.g., by sensing a state of a data line connected to that memory cell. A status register 122 can be in communication with I/O control circuitry 112 and the local memory controller 135 to latch the status information for output to the memory sub-system controller 115.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands can be received over input/output (I/O) pins [7:0] of I/O bus 134 at I/O control circuitry 112 and can then be written into a command register 124. The addresses can be received over input/output (I/O) pins [7:0] of I/O bus 134 at I/O control circuitry 112 and can then be written into address register 114. The data can be received over input/output (I/O) pins [7:0] for an 8-bit device or input/output (I/O) pins [15:0] for a 16-bit device at I/O control circuitry 112 and then can be written into cache register 118. The data can be subsequently written into data register 121 for programming the array of memory cells 104.

In an embodiment, cache register 118 can be omitted, and the data can be written directly into data register 121. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) can be used in the various embodiments.

Figure 2A:
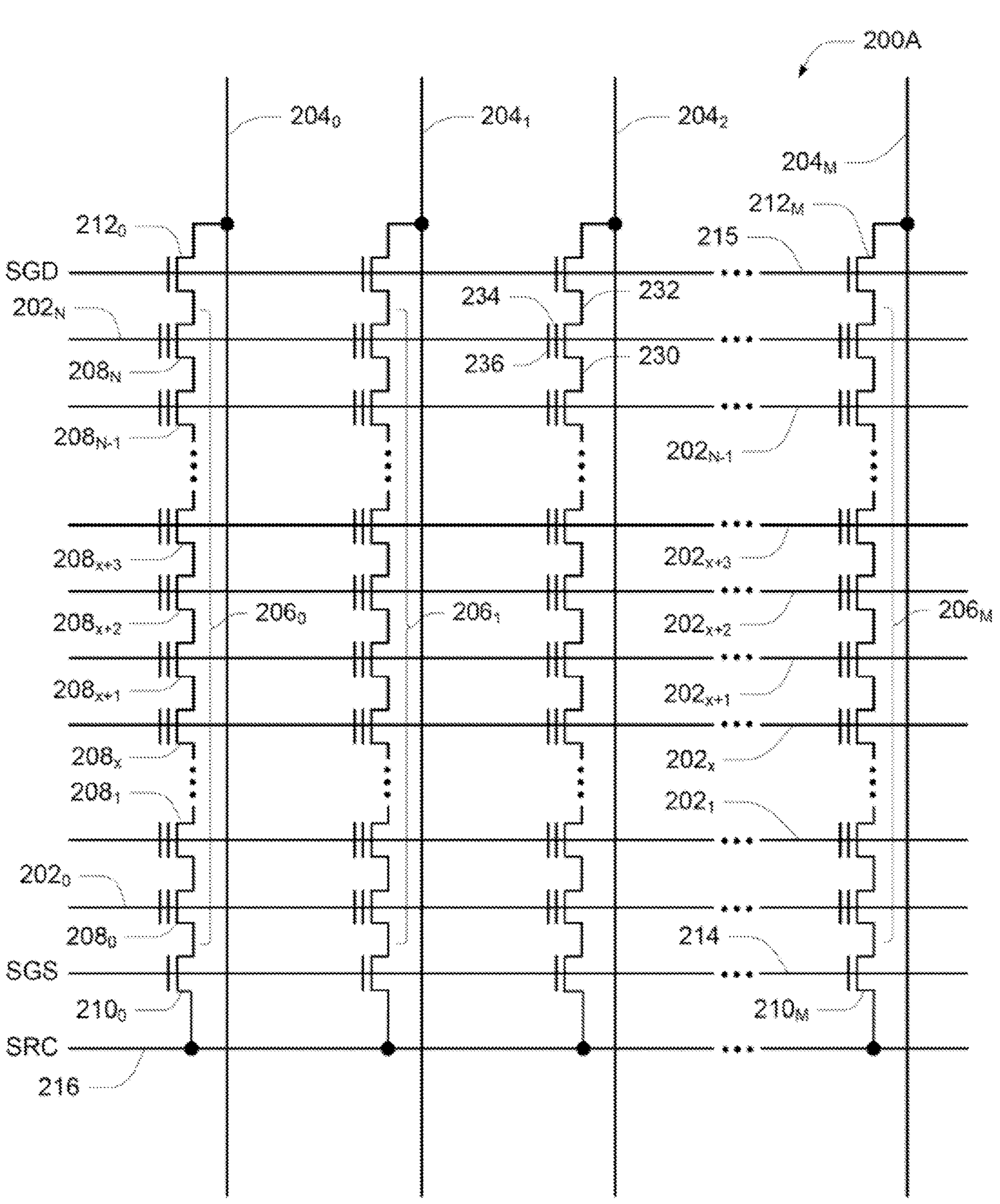
FIG. 2A-2B are schematics of portions of an array of memory cells as could be used in a memory of the type described with reference to FIG. 1B according to an embodiment.
Figure 2B:
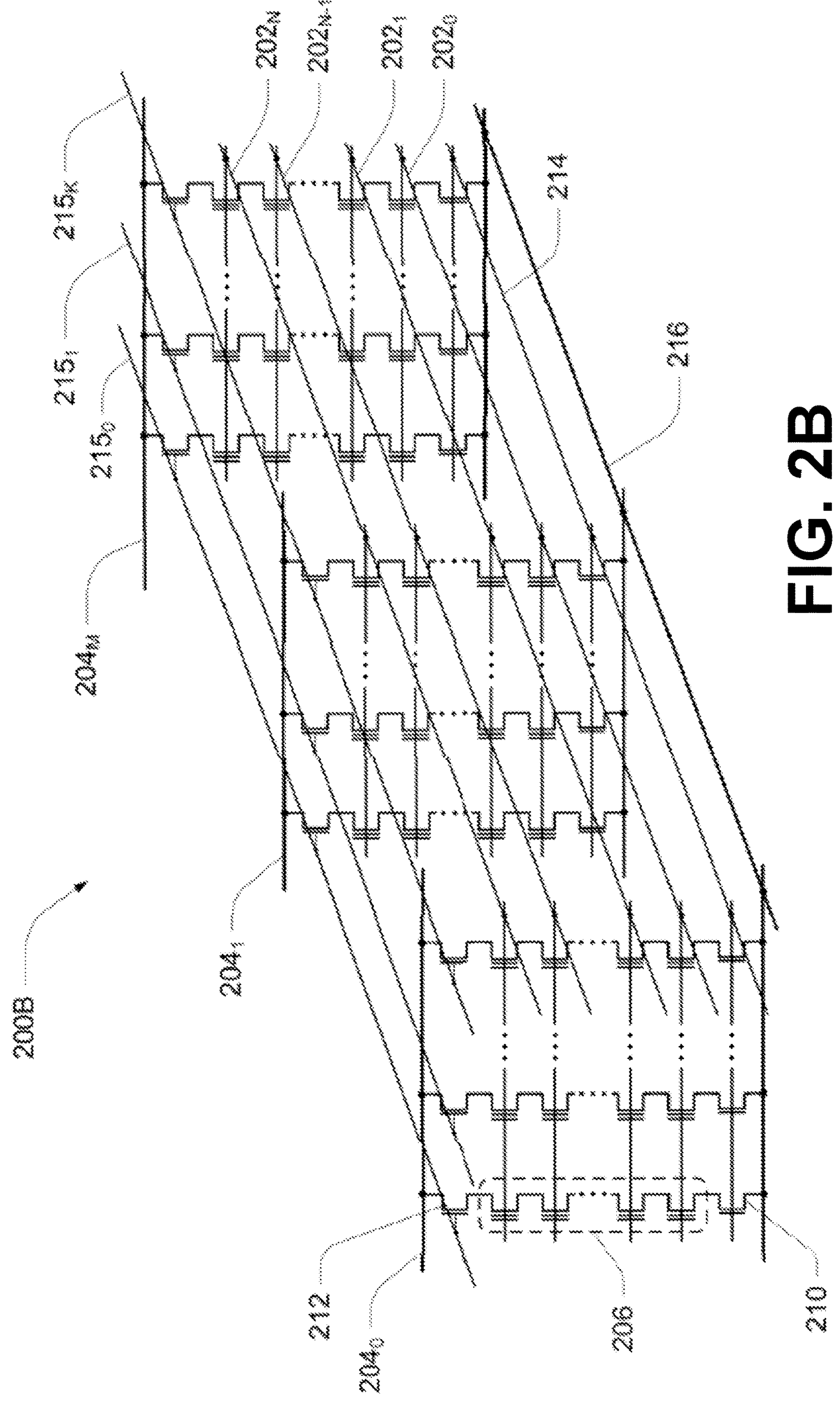

FIG. 2A-2B are schematics of portions of an array of memory cells 200A, such as a NAND memory array, as could be used in a memory of the type described with reference to FIG. 1B according to an embodiment, e.g., as a portion of the array of memory cells 104. Memory array 200A includes access lines, such as wordlines $\mathbf{202}_0$ to $\mathbf{202}_N$, and data lines, such as bitlines $\mathbf{204}_0$ to $\mathbf{204}_M$. The wordlines 202 can be connected to global access lines (e.g., global wordlines), not shown in FIG. 2A, in a many-to-one relationship. For some embodiments, memory array 200A can be formed over a semiconductor that, for example, can be conductively doped to have a conductivity type, such as a p-type conductivity, e.g., to form a p-well, or an n-type conductivity, e.g., to form an n-well.

Memory array 200A can be arranged in rows (each corresponding to a wordline 202) and columns (each corresponding to a bitline 204). Each column can include a string of series-connected memory cells (e.g., non-volatile memory cells), such as one of NAND strings $\mathbf{206}_0$ to $\mathbf{206}_M$. Each NAND string 206 can be connected (e.g., selectively connected) to a common source (SRC) 216 and can include memory cells $\mathbf{208}_0$ to $\mathbf{208}_N$. The memory cells 208 can represent non-volatile memory cells for storage of data. The memory cells 208 of each NAND string 206 can be connected in series between a select gate 210 (e.g., a field-effect transistor), such as one of the select gates $\mathbf{210}_0$ to $\mathbf{210}_M$ (e.g., that can be source select transistors, commonly referred to as select gate source), and a select gate 212 (e.g., a field-effect transistor), such as one of the select gates $\mathbf{212}_0$ to $\mathbf{212}_M$ (e.g., that can be drain select transistors, commonly referred to as select gate drain). Select gates $\mathbf{210}_0$ to $\mathbf{210}_M$ can be commonly connected to a select line 214, such as a source select line (SGS), and select gates $\mathbf{212}_0$ to $\mathbf{212}_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $\mathbf{208}_0$ of the corresponding NAND string 206. For example, the drain of select gate $\mathbf{210}_0$ can be connected to memory cell $\mathbf{208}_0$ of the corresponding NAND string $\mathbf{206}_0$. Therefore, each select gate 210 can be configured to selectively connect a corresponding NAND string 206 to the common source 216. A control gate of each select gate 210 can be connected to the select line 214.

The drain of each select gate 212 can be connected to the bitline 204 for the corresponding NAND string 206. For example, the drain of select gate $\mathbf{212}_0$ can be connected to the bitline $\mathbf{204}_0$ for the corresponding NAND string $\mathbf{206}_0$. The source of each select gate 212 can be connected to a memory cell $\mathbf{208}_N$ of the corresponding NAND string 206. For example, the source of select gate $\mathbf{212}_0$ can be connected to memory cell $\mathbf{208}_N$ of the corresponding NAND string $\mathbf{206}_0$. Therefore, each select gate 212 can be configured to selectively connect a corresponding NAND string 206 to the corresponding bitline 204. A control gate of each select gate 212 can be connected to select line 215.

The memory array 200A in FIG. 2A can be a quasi-two-dimensional memory array and can have a generally planar structure, e.g., where the common source 216, NAND strings 206 and bitlines 204 extend in substantially parallel planes. Alternatively, the memory array 200A in FIG. 2A can be a three-dimensional memory array, e.g., where NAND strings 206 can extend substantially perpendicular to a plane containing the common source 216 and to a plane containing the bitlines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2A. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bitline 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $\mathbf{202}_N$ and selectively connected to even bitlines 204 (e.g., bitlines $\mathbf{204}_0$, $\mathbf{204}_2$, $\mathbf{204}_4$, etc.) can be one physical page of the memory cells 208 (e.g., even memory cells) while memory cells 208 commonly connected to wordline $\mathbf{202}_N$ and selectively connected to odd bitlines 204 (e.g., bitlines $\mathbf{204}_1$, $\mathbf{204}_3$, $\mathbf{204}_5$, etc.) can be another physical page of the memory cells 208 (e.g., odd memory cells).

Although bitlines $\mathbf{204}_3$-$\mathbf{204}_5$ are not explicitly depicted in FIG. 2A, it is apparent from the figure that the bitlines 204 of the array of memory cells 200A can be numbered consecutively from bitline $\mathbf{204}_0$ to bitline $\mathbf{204}_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $\mathbf{202}_0$-$\mathbf{202}_N$ (e.g., all NAND strings 206 sharing common wordlines 202). Unless expressly distinguished, a reference to a page of memory cells herein refers to the memory cells of a logical page of memory cells. Although the example of FIG. 2A is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

FIG. 2B is another schematic of a portion of an array of memory cells 200B as could be used in a memory of the type described with reference to FIG. 1B, e.g., as a portion of the array of memory cells 104. Like numbered elements in FIG. 2B correspond to the description as provided with respect to FIG. 2A. FIG. 2B provides additional detail of one example of a three-dimensional NAND memory array structure. The three-dimensional NAND memory array 200B can incorporate vertical structures which can include semiconductor pillars where a portion of a pillar can act as a channel region of the memory cells of NAND strings 206. The NAND strings 206 can be each selectively connected to a bitline $\mathbf{204}_0$-$\mathbf{204}_M$ by a select transistor 212 (e.g., that can be drain select transistors, commonly referred to as select gate drain) and to a common source 216 by a select transistor 210 (e.g., that can be source select transistors, commonly referred to as select gate source). Multiple NAND strings 206 can be selectively connected to the same bitline 204. Subsets of NAND strings 206 can be connected to their respective bitlines 204 by biasing the select lines $\mathbf{215}_0$-$\mathbf{215}_K$ to selectively activate particular select transistors 212 each between a NAND string 206 and a bitline 204. The select transistors 210 can be activated by biasing the select line 214. In some embodiments, each sub-block or string of memory cells has a separate select line 214 from other sub-blocks or strings. In some embodiments, a pair of sub-blocks shares a select line 214. Each wordline 202 can be connected to multiple rows of memory cells of the memory array 200B. Rows of memory cells that are commonly connected to each other by a particular wordline 202 can collectively be referred to as tiers.

Figure 3:
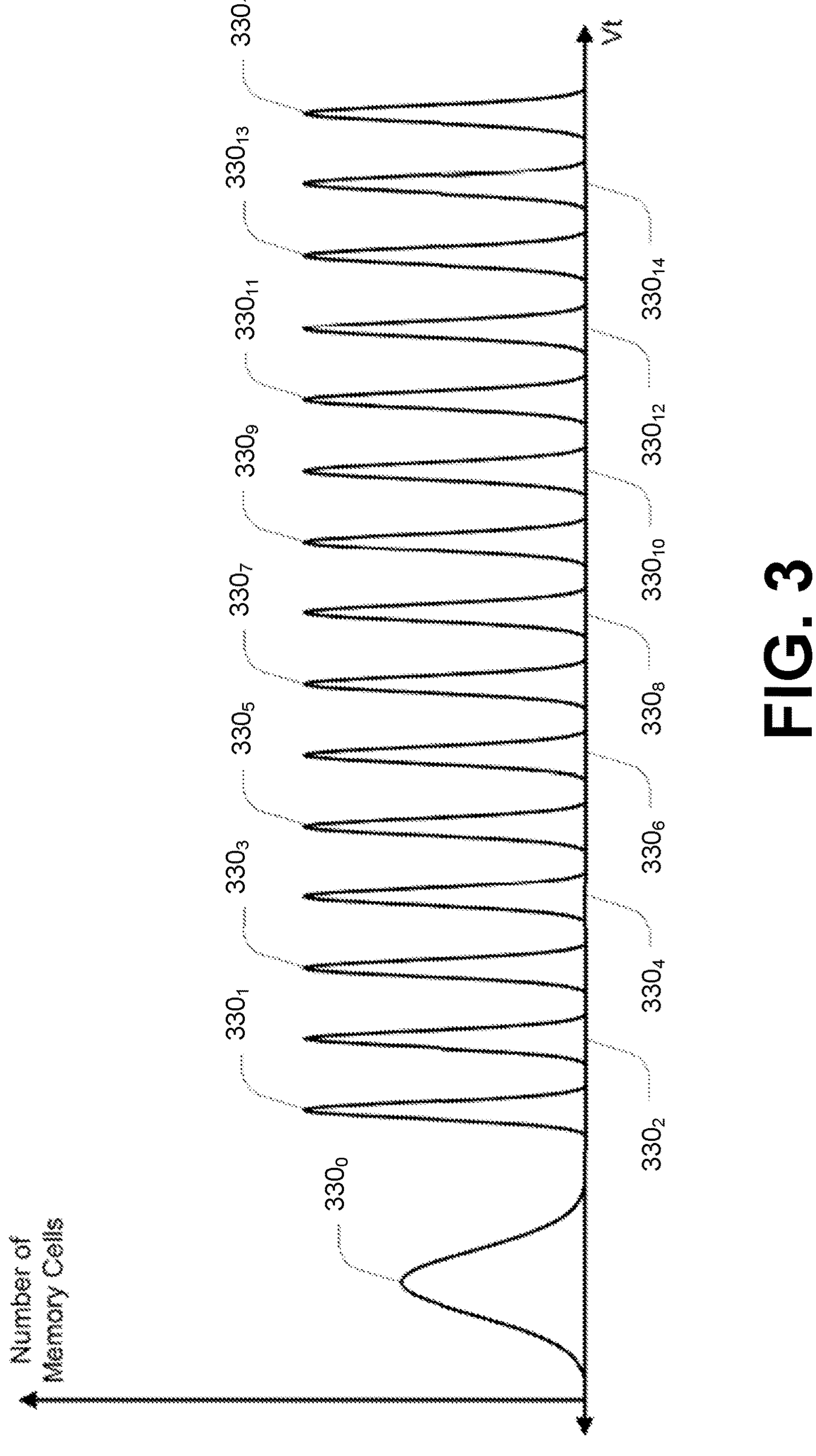
FIG. 3 is a conceptual depiction of threshold voltage distributions of multiple memory cells of a memory array according to an embodiment.

FIG. 3 is a conceptual depiction of threshold voltage ranges of multiple memory cells. FIG. 3 illustrates an example of threshold voltage ranges and their distributions for a population of a sixteen-level memory cells, e.g., QLC memory cells. For example, such a memory cell can be programmed to a threshold voltage (Vt) that falls within one of sixteen ("16") different threshold voltage ranges $\mathbf{330}_0$-$\mathbf{330}_{15}$, each being used to represent a data state corresponding to a bit pattern of four bits. The threshold voltage range $\mathbf{330}_0$ typically has a greater width than the remaining threshold voltage ranges $\mathbf{330}_1$-$\mathbf{330}_{15}$ as memory cells are generally all placed in the data state corresponding to the threshold voltage range $\mathbf{330}_0$, then subsets of those memory cells are subsequently programmed to have threshold voltages in one of the threshold voltage ranges $\mathbf{330}_1$-$\mathbf{330}_{15}$. As programming operations are generally more incrementally controlled than erase operations, these threshold voltage ranges $\mathbf{330}_1$-$\mathbf{330}_{15}$ can tend to have tighter distributions.

TABLE 1

| Data State | Logical Data Value | Data State | Logical Data Value |
|---|---|---|---|
| L0 | 1111 | L8 | 0110 |
| L1 | 1110 | L9 | 0100 |
| L2 | 1010 | L10 | 1100 |
| L3 | 1000 | L11 | 1101 |
| L4 | 1001 | L12 | 0101 |
| L5 | 0001 | L13 | 0111 |
| L6 | 0000 | L14 | 0011 |
| L7 | 0010 | L15 | 1011 |

The threshold voltage ranges $\mathbf{330}_0$, $\mathbf{330}_1$, $\mathbf{330}_2$, $\mathbf{330}_3$, $\mathbf{330}_4$, $\mathbf{330}_5$, $\mathbf{330}_6$, $\mathbf{330}_7$, $\mathbf{330}_8$, $\mathbf{330}_9$, $\mathbf{330}_{10}$, $\mathbf{330}_{11}$, $\mathbf{330}_{12}$, $\mathbf{330}_{13}$, $\mathbf{330}_{14}$, and $\mathbf{330}_{15}$ can each represent a respective data state (e.g., Vt level), e.g., L0, L1, L2, L3, L4, L5, L6, L7, L8, L9, L10, L11, L12, L13, L14 and L15, respectively. As an example, if the threshold voltage of a memory cell is within the first of the sixteen threshold voltage ranges $\mathbf{330}_0$, the memory cell in this case can be storing a data state L0 having a data value of logical '1111' and is typically referred to as the erased state of the memory cell. If the threshold voltage is within the second of the sixteen threshold voltage ranges $\mathbf{330}_1$, the memory cell in this case can be storing a data state L1 having a data value of logical '1110'. If the threshold voltage is within the third of the sixteen threshold voltage ranges $\mathbf{330}_2$, the memory cell in this case can be storing a data state L2 having a data value of logical '1010,' and so on. Table 1 provides one possible correspondence (e.g., encoding) between the data states and their corresponding logical data values (or logical states). Other assignments of data states (e.g., Vt levels) to logical data values (e.g., logical bit patterns) are known or can be envisioned. Memory cells remaining in the lowest data state (e.g., the erased state or L0 data state), as used herein, will be deemed to be programmed to the lowest data state.

Figure 4:
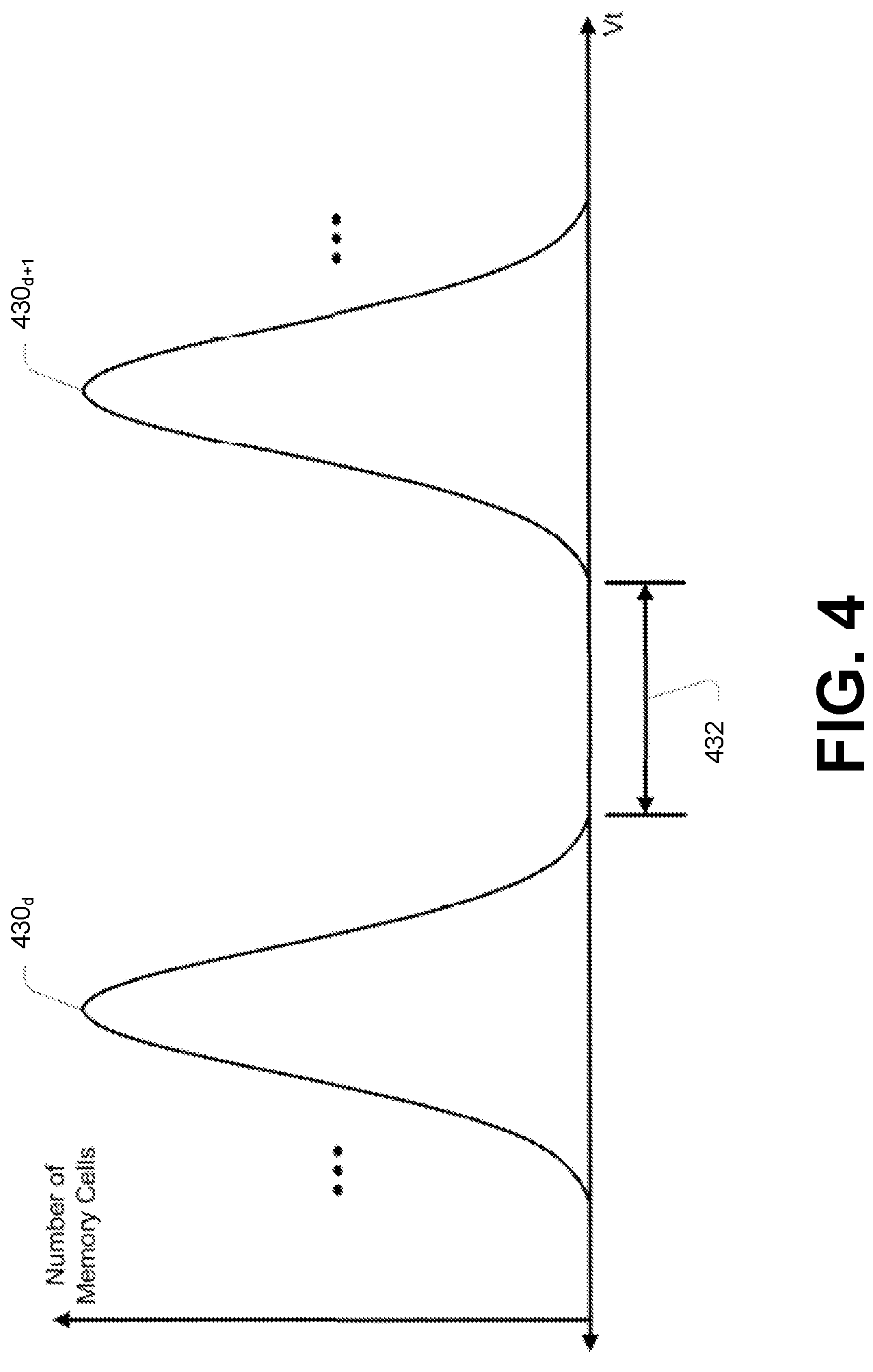
FIG. 4 is a conceptual depiction of a threshold voltage distribution of multiple memory cells at one stage following programming for use with various embodiments.

FIG. 4 is a conceptual depiction of a threshold voltage distribution of multiple memory cells following a programming operation. The threshold voltage distributions $\mathbf{430}_d$-$\mathbf{430}_{d+1}$ of FIG. 4 can represent some portion of the distributions for threshold voltage ranges $\mathbf{330}_0$-$\mathbf{330}_{15}$ of FIG. 3 at the completion of a programming operation for memory cells. With reference to FIG. 4, adjacent threshold voltage distributions 430 are typically separated by some read window margin 432 (e.g., dead space) at the completion of programming. Applying a sense voltage (e.g., read level voltage) within the read window margin 432 to the control gates of the multiple memory cells can be used to distinguish between the memory cells of the threshold voltage distribution $\mathbf{430}_d$ (and any lower threshold voltage distribution) and the memory cells of the threshold voltage distribution $\mathbf{430}_{d+1}$ (and any higher threshold voltage distribution).

Due to the phenomenon known as slow charge loss (SCL), the threshold voltage of a memory cell changes in time as the electric charge of the cell is degrading, which is referred to as "temporal voltage shift" (since the degrading electric charge causes the voltage distributions to shift along the voltage axis towards lower voltage levels). The threshold voltage is changing rapidly at first (immediately after the memory cell was programmed, referred to as quick charge loss (QLC)), and then slows down in an approximately logarithmic linear fashion with respect to the time elapsed since the cell programming event. This temporal voltage shift reduces the read window margin 432 between the threshold voltage distributions 430*a*-$\mathbf{430}_{d+1}$ over time, and can cause these threshold voltage distributions to overlap, making it more difficult to distinguish between adjacent threshold voltage distributions.

Figures 5A, 5B:
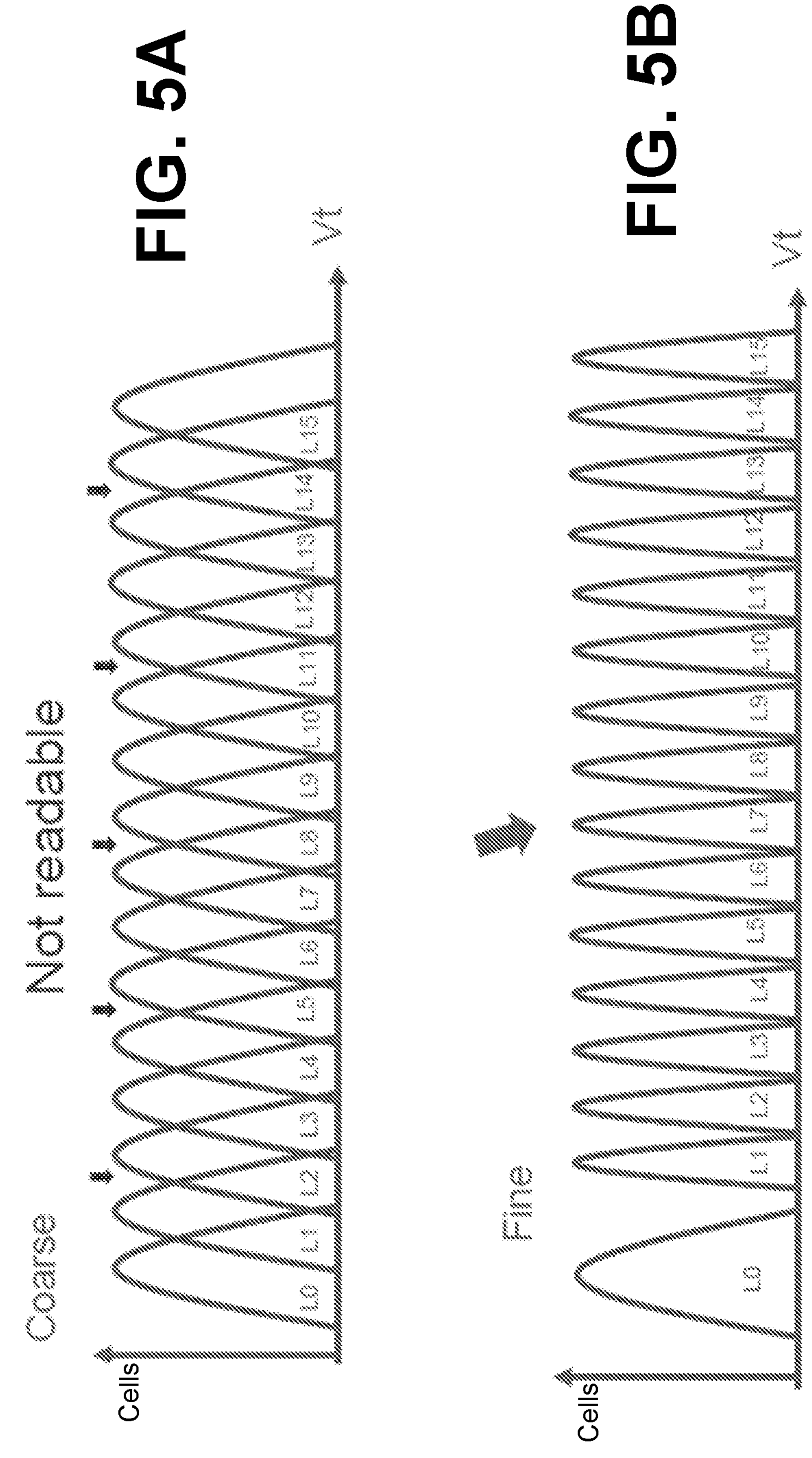
FIG. 5A is a graph illustrating an example of a set of threshold voltage distributions, after coarse programming, that are not readable according to at least one embodiment.
FIG. 5B is a graph illustrating the example of the set of threshold voltage distributions (FIG. 5B), after fine programming, that are readable according to at least one embodiment.

FIG. 5A is a graph illustrating an example of a set of threshold voltage distributions, after coarse programming, that are not readable according to at least one embodiment. Coarse programming can be compared to initial pass programming in which the Vt distributions are highly overlapped when coarse programming many Vt distributions, e.g., as is the case in programming QLC or PLC memory. Due to this overlapping of the Vt distributions, the coarse-programmed sets of threshold Vt distributions may also be referred to herein as intermediate Vt distributions. This overlapping occurs due to less precise programming in which each Vt distribution widely covers a range of threshold voltage that coarsely approximates a more accurate (finer) threshold voltage range that is intended for each respective Vt distribution.

FIG. 5B is a graph illustrating the example of the set of threshold voltage distributions (FIG. 5B), after fine programming, that are readable according to at least one embodiment. When fine programming is completed, e.g., to a final set of Vt distributions, each Vt distribution is more finely defined over a focused threshold voltage range intended for each respective logical state. When this occurs, the read window margins between respective Vt distributions are widened such that individual logical states across different memory cells of a set of memory cells can be distinguished when read. Thus, while a higher BER might occur in reading the logical states out of the coarse-programmed Vt distributions of FIG. 5A, a low BER would be expected in reading the logical states out of the fine-programmed logical states of FIG. 5B.

Figure 6A:
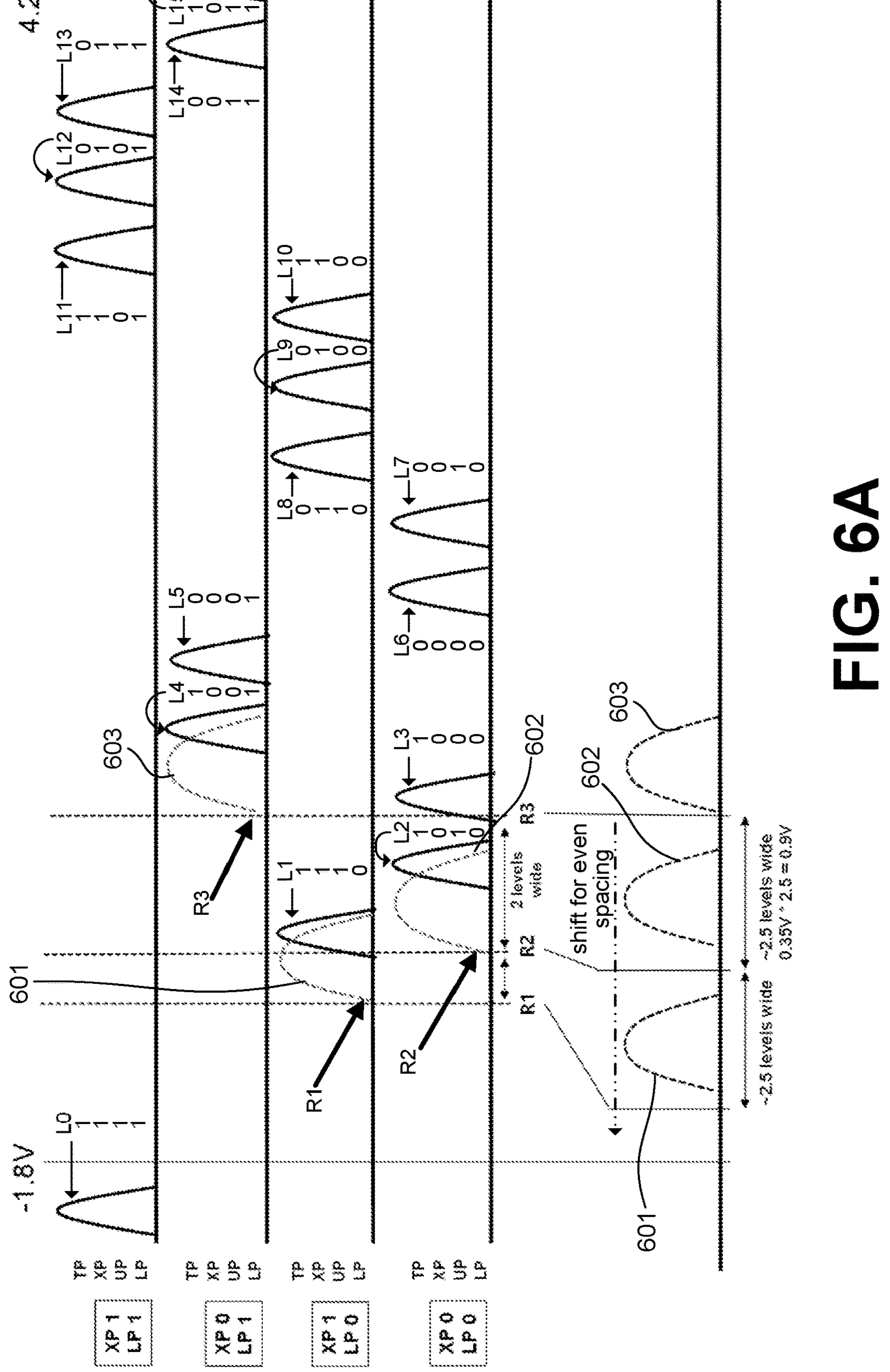
FIG. 6A is a graph illustrating a pre-program pass using a multi-level cell (MLC) logical state before programming to quad-level cell (QLC) memory according to various embodiments.

FIG. 6A is a graph illustrating a pre-program pass using a multi-level cell (MLC) logical state before programming to quad-level cell (QLC) memory according to various embodiments. FIGS. 6B-6E are annotated tables illustrating different MLC-based encoding that is transitionable to QLC-based encoding and thus usable for the pre-program pass according to various embodiments. As illustrated, in some embodiments, the MLC logical states for the pre-program pass are derived from the extra page (XP) and lower page (LP) bits, generally in that order, due to the potential grouping of the XP/LP bits, as will be discussed in more detail with reference to FIGS. 6B-6E. With different QLC logical coding, different page bits can be chosen for grouping, for example, TP/XP, XP/UP, TP/LP, UP/LP, or the like. Thus, the present disclosure is not confined to only use of the XP/LP bits of QLC coding for the MLC logical state coding.

TABLE 2

| XP/LP Bits (MLC Coding) | ~QLC Logical State(s) for MLC Coding | Target QLC Logical States | FIG. (with gray coding) |
|---|---|---|---|
| 11 | L0 | L0, L11, L12, L13 | FIG. 6B |
| 01 | L4 | L4, L5, L14, L15 | FIG. 6C |
| 10 | L1 | L1, L8, L9, L10 | FIG. 6D |
| 00 | L2 | L2, L3, L6, L7 | FIG. 6E |

As an exemplary embodiment, however, the XP/LP-based MLC bits can be variably employed as initial QLC coding according to Table 2. As can be observed, the MLC logical states are adapted from lower corresponding QLC logical states, as follows. With reference to MLC logical state "11," the erase data state (L0) illustrated at the top in FIG. 6A is the only lower QLC logical state to include a "11" coding, and thus is used for the first MLC logical state. As illustrated with dashed line 620 in FIG. 6B, the XP/LP bits of QLC data states L11, L12, and L13 also have a "11" coding. Thus, the QLC erase state (L0) can initially represent all four of these QLC data states, as illustrated in Table 2, with their corresponding QLC logical states.

With reference to MLC logical state "01," the XP/LP bits of QLC data state L4 is the lowest QLC logical state with a "01" coding (see FIG. 6A). As illustrated by dashed line 630 in FIG. 6C, the XP/LP bits of QLC data state L5 also has a "01" encoding. As illustrated by dashed line 632 in FIG. 6C, the XP/LP bits of QLC data states L14 and L15 also have a "01" coding. Thus, the QLC data state L4 can initially represent all four of these QLC data states, as illustrated in Table 2, with their corresponding QLC logical states.

With reference to MLC logical state "10," the XP/LP bits of the QLC data state L1 is the lowest QLC logical state with "10" coding (see FIG. 6A). As illustrated by dashed line 640, in FIG. 6D, the XP/LP bits of the QLC data states L8, L9, and L10 also have a "10" coding. Thus, the QLC data state L1 can initially represent all four of these QLC data states, as illustrated in Table 2, with their corresponding QLC logical states.

With reference to the MLC logical state "00," the XP/LP bits of QLC data state L2 is the lowest QLC logical state with "00" coding (see FIG. 6A). Although data state L3 could also be used and is lower the data state L4, if the QLC logical state to be programmed turns out to be L2, charge is typically not removed to fully program Vt distributions. As illustrated by dashed line 650 of FIG. 6E, the XP/LP bits of QLC data state L3 also has a "00" coding. As illustrated by dashed line 652 in FIG. 6E, the XP/LP bits of QLC data states L6 and L7 also have a "00" coding. Thus, the QLC data state L2 can initially represent all four of these QLC data states, as illustrated Table 2, with their corresponding QLC logical states.

As illustrated in FIG. 6A, the MLC coding roughly corresponds to the L0, L4, L1, and L2 data states, but could be programmed wider, e.g., each MLC distribution covering a threshold voltage range of approximately two QLC Vt distributions. By allowing wider distributions, the pre-program MLC operation can be completed with fewer program pulses. For example, the XP/LP bits of the MLC coding "10" corresponds to QLC data state L1, extending lower to voltage level R1, which is illustrated with dashed line 601. Similarly, the XP/LP bits of the MLC coding "00" corresponds to QLC data state L2, extending lower to voltage level R2, which is illustrated with dashed line 602. Finally, the XP/LP bits of the MLC coding "01" corresponds to the QLC data state L4, extending lower to voltage level R3, which is illustrated with dashed line 603.

Thus, in this exemplary embodiment and with continued reference to FIG. 6A, some constraints can be placed on how the MLC logical states are initially programmed (e.g., the disclosed pre-program pass) to ensure being able to both reliably read the MLC logical states back out of the memory cells and to program the MLC logical states to a voltage level that is not too high for any given target QLC threshold voltage (Vt) distribution. In these embodiments, control logic (e.g., the QLC program manager 137) ensures that the threshold voltage distribution is programmed no higher than a fifth threshold voltage distribution (e.g., corresponding to data state L4) of possible QLC logical states. This ensuring may include, for example, forcing an upper tail of a highest of possible MLC threshold voltage distributions is programmed no higher than an upper tail of the fifth threshold voltage distribution of the possible QLC logical states. As discussed previously, this constraint ensures that the MLC pre-pass Vt level is no higher than a corresponding Vt target voltage for a corresponding QLC logical state.

Further, in some embodiments, the control logic causes a read voltage level for each of a highest three possible threshold voltage distributions for the MLC logical state(s) (e.g., corresponding to the L4, L1, and L2 QLC data states) to be evenly spaced within a threshold percentage. For example, with wider Vt distributions of the MLC pre-program pass, while the MLC logical state "01" (dashed line 603) can remain approximately in the same position, the "10" and "00" logical states (dashed lines 601 and 602) can be shifted to lower voltages. Further, a first width between each of the read voltage levels of the highest three possible threshold voltage distributions could be permitted to be at least twice as wide as a second width between each read voltage level of corresponding QLC logical states. As illustrated in FIG. 6A, the space between the R1 and R2 voltage levels and between the R2 and R3 voltages levels can be as wide as 2.5 times a typical QLC Vt distribution.

Figure 7:
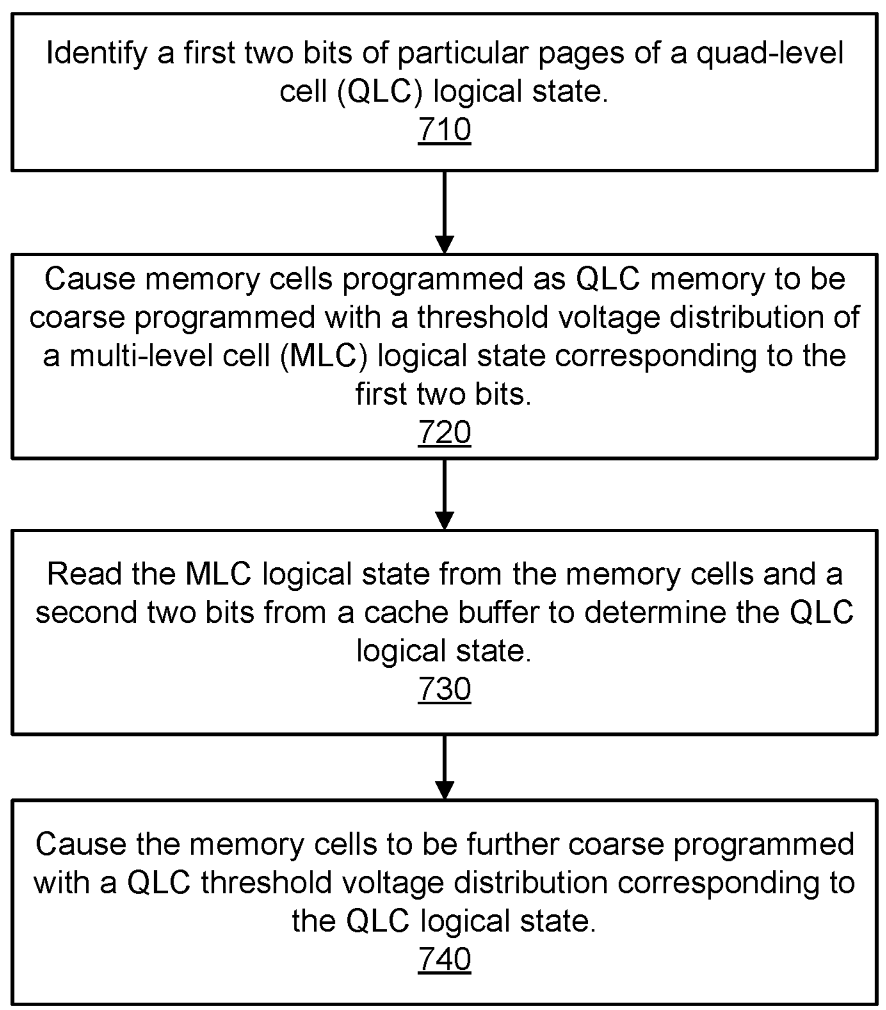
FIG. 7 is a flow diagram of a method for performing a pre-program pass of an MLC logical state before performing a coarse program of a corresponding QLC logical state according to some embodiments.

FIG. 7 is a flow diagram of a method 700 for performing a pre-program pass of an MLC logical state before performing a coarse program of a corresponding QLC logical state according to some embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the local media controller 135 (e.g., control logic) of FIGS. 1A-1B, e.g., by the QLC program manager 137, on a memory array that includes a plurality of memory cells electrically coupled to a plurality of wordlines and a plurality of bitlines. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, two QLC bits are identified. More specifically, the processing logic identifies a first two bits of particular pages of a quad-level cell (QLC) logical state. Although the examples herein illustrate use of the extra page (XP) and lower page (LP) bits of QLC coding, other combinations of two QLC bits are envisioned, as was discussed previously.

At operation 720, memory cells are programmed with a MLC logical state. More specifically, the processing logic causes the memory cells programmed as QLC memory to be coarse programmed with a threshold voltage distribution of a MLC logical state corresponding to the first two bits.

At operation 730, the QLC logical state is determined. More specifically, the processing logic reads the MLC logical state from the memory cells (which are the first two bits) and a second two bits from a cache buffer to determine the QLC logical state. In some embodiments, the cache buffer is the cache buffer 154 (FIG. 1A) or the cache register 118 (FIG. 1B). Thus, in these embodiments, the processing logic also originally stores, in the cache buffer, only the second two bits of four bits of the QLC logical state. In this way, the processing logic access all four bits of the QLC logical state to then be able to determine a corresponding QLC threshold voltage distribution to be coarse programed.

At operation 740, the memory cells are further coarse programmed. More specifically, the processing logic causes the memory cells to be further coarse programmed with a QLC threshold voltage distribution corresponding to the QLC logical.

Figures 8A, 8B:
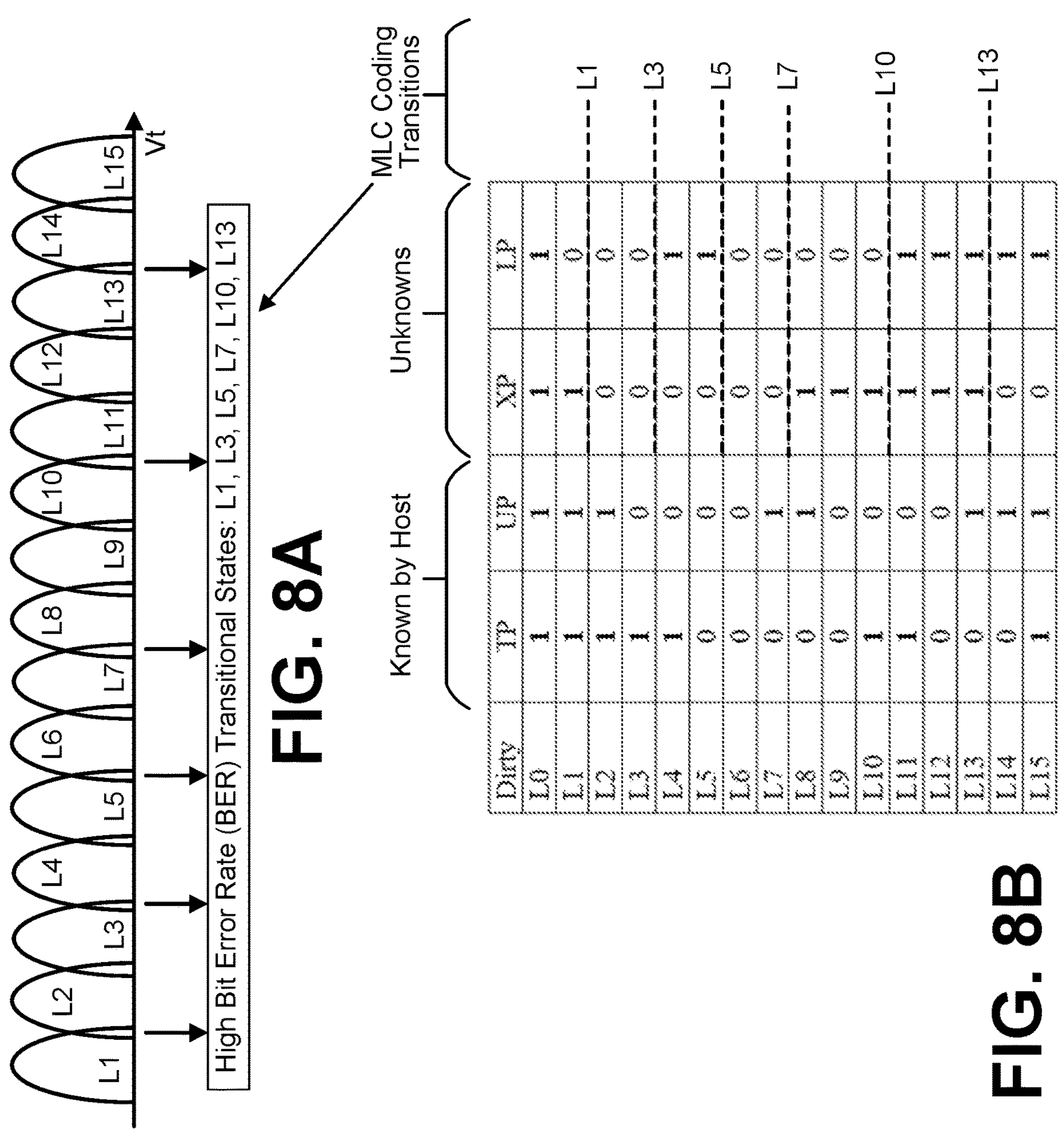
FIG. 8A is a graph illustrating depiction of threshold voltage distributions of possible QLC logical states after having been pre-programmed with the MLC logical state followed by being coarse programmed with the corresponding QLC logical state according to some embodiments.
FIG. 8B is an annotated table illustrating logical bits for pages that are known by the host system and logical bits for pages not known by the host system after having been coarse programed to the corresponding QLC logical state according to some embodiments.

FIG. 8A is a graph illustrating depiction of threshold voltage distributions of possible QLC logical states after having been pre-programmed with the MLC logical state followed by being coarse programmed with the corresponding QLC logical state according to some embodiments. FIG. 8B is an annotated table illustrating logical bits for pages that are known by the host system 120 (e.g., TP/UP) and logical bits for pages not known by the host system 120 (e.g., XP/LP) after having been coarse programed to the corresponding QLC logical state according to some embodiments. Because the XP/LP bits are unknown, transitions in the MLC logical states within the QLC logical coding would result in a high bit error rate (BER) without the ability to correct erroneously read logical states. For example, there would be a higher BER at the transitional data states of L1, L3, L5, L7, L10, L13, e.g., as the upper tails of these data states would be transitioning to a new MLC logical state of the XP/LP bits.

Figure 8C:
FIG. 8C is a graph similar to that of FIG. 8A after shifting target voltages of the QLC logical states that are at a transition in QLC logical coding according to some embodiments.

FIG. 8C is a graph similar to that of FIG. 8A after shifting target voltages of the QLC logical states that are at a transition in QLC logical coding according to some embodiments. In these embodiments, to address the exposure to a high BER when trying to read the coarse-programmed states after the pre-program pass followed by a coarse programming of the 16 QLC logical states, the memory device 130 can first determine whether the MLC logical state e.g., the XP/LP bits programmed in the pre-program pass, are at one of these transitional data states in the QLC coding, e.g., L1, L3, L5, L7, L10, or L13. In some embodiments, if the MLC logical state matches one of these transitional data states, the memory device 130 shifts the target voltage level of the QLC logical state to be programmed down to an updated target voltage level, e.g., by a predetermined voltage such as somewhere between 50-200 mV depending on memory device design and read window budget between these logical states that may be required.

FIG. 8C illustrates how this shift would impact the highest 15 threshold voltage distributions of the QLC data states L1-L15. The high BER states L1, L3, L5, L7, L10, and L13 have been shifted to the left by about the same predetermined voltage. Because these high BER states now have good separation from each other, the risk of high BER is reduced to levels comparable to the threshold distributions after the fine program phase, which are correctable by error code correction (ECC). It can be noted that some of the normal BER states (e.g., L2, L4, L6, L9, L12) are heavily overlapped by one of the shifted high BER states. An error in reading one of the normal BER states is forgivable, as the memory device 130 can access the TP/UP bits in the cache buffer 154 and combine them with the MLC coding read out of the memory cells after the pre-program pass. In this way, the memory device 130 can determine what the QLC logical state should be before performing a fine programming of the QLC logical state after the coarse programming.

Figure 9:
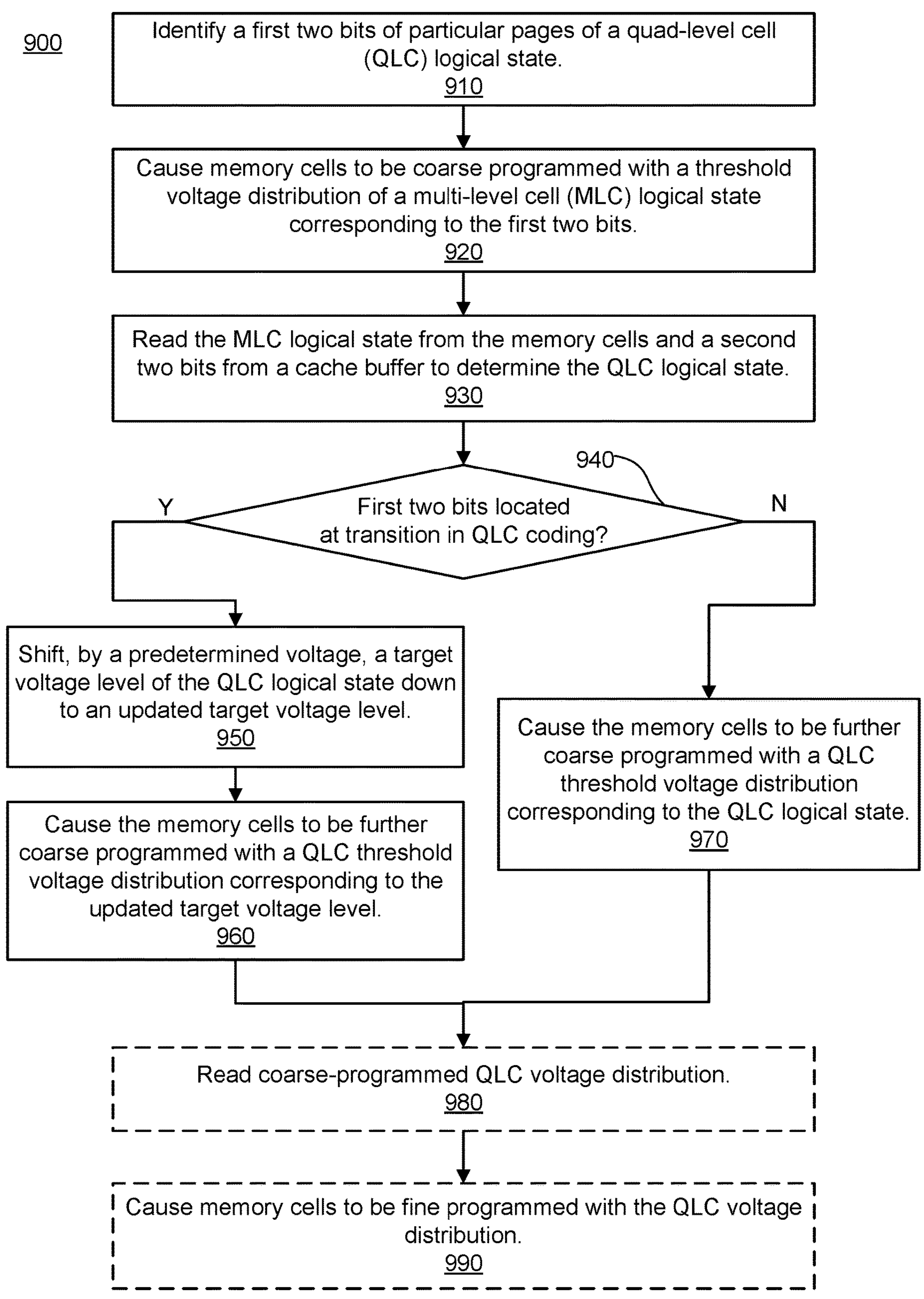
FIG. 9 is a flow diagram of an example method of performing a pre-program pass of an MLC logical state that includes an optional shifting of a target voltage level of the threshold voltage distribution of the corresponding QLC logical state according to various embodiments.

FIG. 9 is a flow diagram of an example method 900 of performing a pre-program pass of an MLC logical state that includes an optional shifting of a target voltage level of the threshold voltage distribution of the corresponding QLC logical state according to various embodiments. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the local media controller 135 (e.g., control logic) of FIGS. 1A-1B, e.g., by the QLC program manager 137, on a memory array that includes a plurality of memory cells electrically coupled to a plurality of wordlines and a plurality of bitlines. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 910, two QLC bits are identified. More specifically, the processing logic identifies a first two bits of particular pages of a quad-level cell (QLC) logical state. Although the examples herein illustrate use of the extra page (XP) and lower page (LP) bits of QLC coding, other combinations of two QLC bits are envisioned, as was discussed previously.

At operation 920, the memory cells are programmed with a MLC logical state. More specifically, the processing logic causes the memory cells of the memory array to be coarse programmed with a threshold voltage distribution of a multi-level cell (MLC) logical state corresponding to the first two bits.

At operation 930, the QLC logical state is determined. More specifically, the processing logic reads the MLC logical state from the memory cells (which are the first two bits) and a second two bits from a cache buffer to determine the QLC logical state. In some embodiments, the cache buffer is the cache buffer 154 (FIG. 1A) or the cache register 118 (FIG. 1B). Thus, in these embodiments, the processing logic also originally stores, in the cache buffer, only the second two bits of four bits of the QLC logical state. In this way, the processing logic access all four bits of the QLC logical state to then be able to determine a corresponding QLC threshold voltage distribution to be coarse programed.

In some embodiments of the method 900, the processing logic also determines that the second two bits read from the cache buffer are incorrect. The processing logic can then update the QLC threshold voltage distribution for the QLC logical state based on correct values for the second two bits, which generates an updated QLC threshold voltage distribution that may be used at operation 990 to perform fine programming of the memory cells to the updated QLC threshold voltage distribution.

At operation 940, the first two bits are checked for transitions. More specifically, the processing logic determines whether the first two bits are located at a transition in MLC logical state within the QLC logical coding, e.g., the gray coding for QLC data states.

At operation 950, QLC target voltages are shifted. More specifically, the processing logic shifts, by a predetermined voltage, a target voltage level of the QLC logical state down to an updated target voltage level in response to determining, at operation 940, the first two bits are located at a transition in MLC logical state within QLC logical coding.

At operation 960, the memory cells are coarse programmed. More specifically, the processing logic causes the memory cells to be further coarse programmed with a QLC threshold voltage distribution to the updated target voltage level.

At operation 970, the memory cells are coarse programmed without the prior Vt shifting. More specifically, the processing logic causes the memory cells to be further coarse programed with a QLC threshold voltage distribution corresponding to the QLC logical state in response to determining, at operation 940, the first two bits are not located at a transition in MLC logical stated within he QLC logical coding.

At operation 980, the coarse-programmed states are optionally read. More specifically, the processing logic reads the QLC threshold voltage distribution that has been coarse programmed to the memory cells at the updated target voltage level (if the method 900 passed through operation 950) or corresponding to a default Vt level for the QLC logical state (if the method 900 passed through operation 970).

At operation 990, the memory cells are fine programed. More specifically, the processing logic causes the memory cells to be fine programmed with the QLC threshold voltage distribution.

Figure 10:
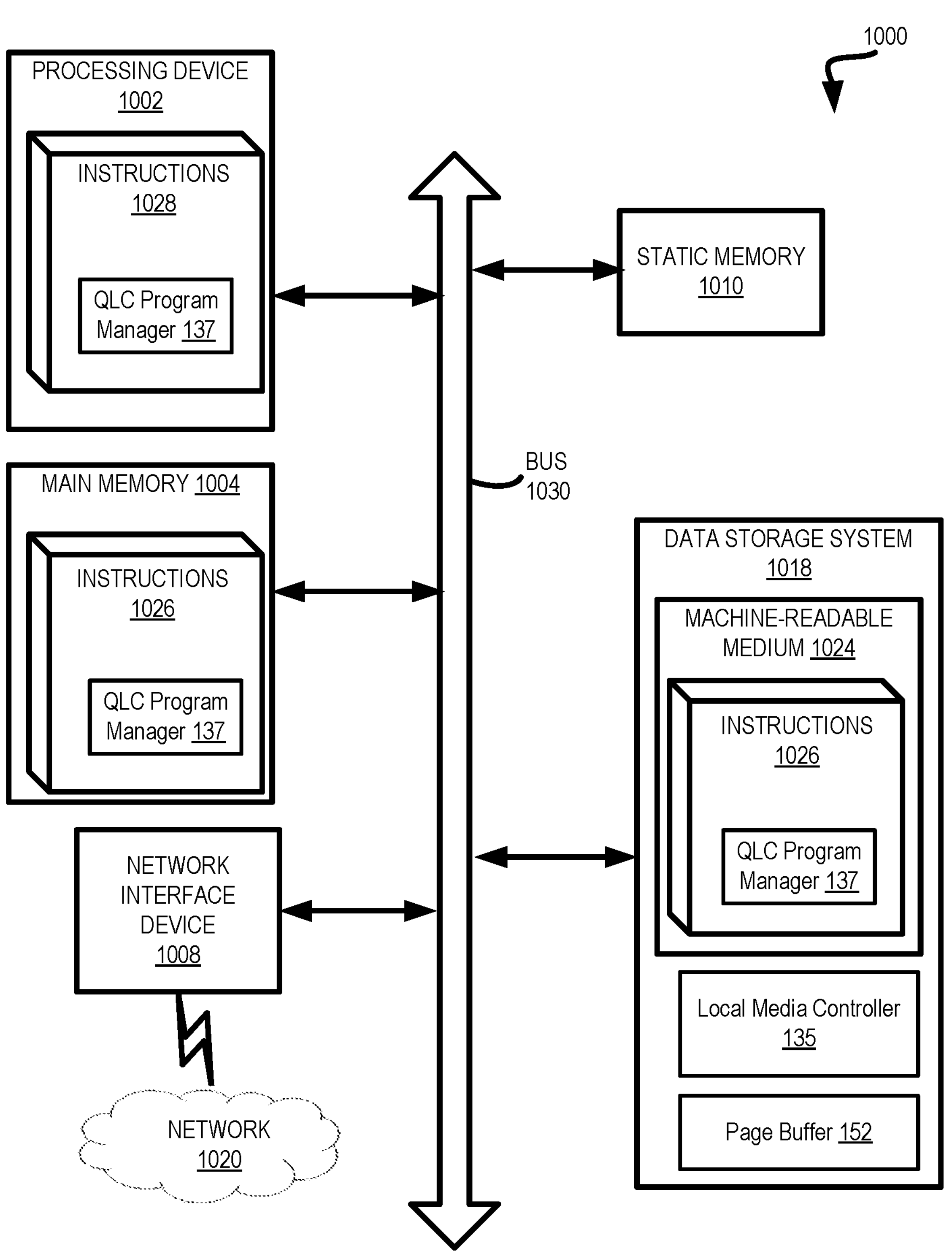
FIG. 10 is a block diagram of an example computer system in which embodiments of the present disclosure can operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the memory sub-system controller 115 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1010 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1028 for performing the operations and steps discussed herein. The computer system 1000 can further include a network interface device 1008 to communicate over the network 1020.

The data storage system 1018 can include a machine-readable storage medium 1024 (also known as a non-transitory computer-readable storage medium) on which is stored one or more sets of instructions 1026 or software embodying any one or more of the methodologies or functions described herein, including those associated with the QLC program manager 137. The data storage system 1018 can further include the local media controller 135 and the page buffer 152 that were previously discussed. The instructions 1028 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1A.

In one embodiment, the instructions 1026 include instructions to implement functionality corresponding to a controller (e.g., the memory sub-system controller 115 of FIG. 1A). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:

a memory array configured as quad-level cell (QLC) memory; and control logic operatively coupled to the memory array, the control logic to perform operations comprising:

identifying a first two bits of particular pages of a QLC logical state;

causing memory cells of the memory array to be coarse programmed with a threshold voltage distribution of a multi-level cell (MLC) logical state corresponding to the first two bits;

reading the MLC logical state from the memory cells and a second two bits from a cache buffer to determine the QLC logical state;

determining that the first two bits are located at a transition in the MLC logical state within a QLC logical coding;

in response to the determining, shifting, by a predetermined voltage, a target voltage level of the QLC logical state down to an updated target voltage level; and causing the memory cells to be further coarse programmed with the updated target voltage level of a QLC threshold voltage distribution corresponding to the QLC logical state.

2. The memory device of claim 1, wherein the operations further comprise storing, in the cache buffer, only the second two bits of four bits of the QLC logical state.

3. The memory device of claim 1, wherein the operations further comprise ensuring that the threshold voltage distribution is programmed no higher than a fifth threshold voltage distribution of possible QLC logical states, including forcing an upper tail of a highest of possible MLC threshold voltage distributions is programmed no higher than an upper tail of the fifth threshold voltage distribution of the possible QLC logical states.

4. The memory device of claim 1, wherein the operations further comprise causing a read voltage level for each of a highest three possible threshold voltage distributions for the MLC logical state to be evenly spaced within a threshold percentage.

5. The memory device of claim 4, wherein a first width between each of the read voltage levels of the highest three possible threshold voltage distributions is at least twice as wide as a second width between each read voltage level of corresponding QLC logical states.

6. The memory device of claim 1, wherein the particular pages of the QLC logical state comprise at least one of an extra page or a lower page.

7. A method comprising:

identifying, by a memory device, a first two bits of particular pages of a quad-level cell (QLC) logical state;

causing memory cells programmed as QLC memory to be coarse programmed with a threshold voltage distribution of a multi-level cell (MLC) logical state corresponding to the first two bits;

ensuring that the threshold voltage distribution is programmed no higher than a fifth threshold voltage distribution of possible QLC logical states;

reading the MLC logical state from the memory cells and a second two bits from a cache buffer to determine the QLC logical state; and causing the memory cells to be further coarse programmed with a QLC threshold voltage distribution corresponding to the QLC logical state.

8. The method of claim 7, further comprising storing, in the cache buffer, only the second two bits of four bits of the QLC logical state.

9. The method of claim 7, wherein the ensuring comprises forcing an upper tail of a highest of possible MLC threshold voltage distributions is programmed no higher than an upper tail of the fifth threshold voltage distribution of the possible QLC logical states.

10. The method of claim 7, further comprising causing a read voltage level for each of a highest three possible threshold voltage distributions for the MLC logical state to be evenly spaced within a threshold percentage.

11. The method of claim 10, wherein a first width between each of the read voltage levels of the highest three possible threshold voltage distributions is at least twice as wide as a second width between each read voltage level of corresponding QLC logical states.

12. The method of claim 7, wherein the particular pages of the QLC logical state comprise at least one of an extra page or a lower page.

13. A computer-readable storage medium that stores instructions, which when executed by a processing device of a memory sub-system, causes the processing device to perform operations comprising:

identifying a first two bits of particular pages of a quad-level cell (QLC) logical state;

causing memory cells programmed as QLC memory to be coarse programmed with a threshold voltage distribution of a multi-level cell (MLC) logical state corresponding to the first two bits;

reading the MLC logical state from the memory cells and a second two bits from a cache buffer to determine the QLC logical state;

determining that the first two bits are located at a transition in the MLC logical state within a QLC logical coding;

in response to the determining, shifting, by a predetermined voltage, a target voltage level of the QLC logical state down to an updated target voltage level; and causing the memory cells to be further coarse programmed with the updated target voltage level of a QLC threshold voltage distribution corresponding to the QLC logical.

14. The computer-readable storage medium of claim 13, wherein the operations further comprise storing, in the cache buffer, only the second two bits of four bits of the QLC logical state.

15. The computer-readable storage medium of claim 13, wherein the operations further comprise causing a read voltage level for each of a highest three possible threshold voltage distributions for the MLC logical state to be evenly spaced within a threshold percentage.

16. The computer-readable storage medium of claim 15, wherein a first width between each of the read voltage levels of the highest three possible threshold voltage distributions is at least twice as wide as a second width between each read voltage level of corresponding QLC logical states.

17. The computer-readable storage medium of claim 13, wherein the particular pages of the QLC logical state comprise at least one of an extra page or a lower page.

18. The computer-readable storage medium of claim 13, wherein the operations further comprise ensuring that the threshold voltage distribution is programmed no higher than a fifth threshold voltage distribution of possible QLC logical states, including forcing an upper tail of a highest of possible MLC threshold voltage distributions is programmed no higher than an upper tail of the fifth threshold voltage distribution of the possible QLC logical states.

* * * * *